United States Patent [19]

Wegscheider et al.

[11] Patent Number: 5,191,962
[45] Date of Patent: Mar. 9, 1993

[54] TURNING DEVICE FOR PARCELS TRANSPORTED ON A BELT CONVEYOR

[75] Inventors: Jürgen Wegscheider, Isny; Franz Hartmann, Weiler; Roland Zeuschner, Hergatz, all of Fed. Rep. of Germany

[73] Assignee: Natec, Reich, Summer GmbH & Co. KG., Fed. Rep. of Germany

[21] Appl. No.: 710,698

[22] Filed: Jun. 5, 1991

[30] Foreign Application Priority Data

Dec. 22, 1990 [DE] Fed. Rep. of Germany ....... 4041477

[51] Int. Cl.⁵ .................................................. B65G 29/00
[52] U.S. Cl. ..................................... 198/415; 198/817
[58] Field of Search ............... 198/415, 817, 835, 623, 198/575, 576, 460, 461

[56] References Cited

U.S. PATENT DOCUMENTS

| | | | |
|---|---|---|---|
| 1,069,362 | 8/1913 | Wegner | 198/415 |
| 1,085,774 | 2/1914 | Wegner | 198/415 |
| 1,192,832 | 7/1916 | Sherman | 198/415 |
| 2,305,730 | 12/1942 | O'Brien et al. | 474/187 |
| 3,491,903 | 1/1970 | Hedrick et al. | 198/349.8 |
| 4,881,635 | 11/1989 | Raschke | 198/460 |
| 4,960,198 | 10/1990 | Wilhelm | 198/461 X |

FOREIGN PATENT DOCUMENTS

| | | |
|---|---|---|
| 1209054 | 1/1966 | Fed. Rep. of Germany |
| 1218341 | 6/1966 | Fed. Rep. of Germany |
| 1531948 | 1/1970 | Fed. Rep. of Germany |
| 1756233 | 4/1970 | Fed. Rep. of Germany |
| 1436856 | 3/1971 | Fed. Rep. of Germany |
| 3421413 | 12/1985 | Fed. Rep. of Germany |
| 219592 | 4/1986 | Fed. Rep. of Germany |
| 3917115 | 11/1990 | Fed. Rep. of Germany |

Primary Examiner—Robert P. Olszewski
Assistant Examiner—Cheryl L. Gastineau
Attorney, Agent, or Firm—Brown, Martin, Haller & McClain

[57] ABSTRACT

A turning device for articles conveyed on a conveyor comprises a set of conveyor belts which together convey the article, the belts being driven at different speeds which increase from one side of the conveyor to the other. The speed differential is imparted by a drive shaft around which the belts pass, each belt passing around a pulley on the shaft. The diameters of the pulleys increase from one end of the shaft to the other and the pulleys are driven in rotation together.

11 Claims, 3 Drawing Sheets

TURNING DEVICE FOR PARCELS TRANSPORTED ON A BELT CONVEYOR

FIELD OF THE INVENTION

The present invention relates to a turning device for articles conveyed on a conveyor of the type comprising a plurality of part conveyor belts capable of being driven at different speeds.

In mechanical handling, when packages or the like are being transported on belt conveyors, there may be a need to rotate an article on the conveyor with respect to the conveying direction. For instance, such rotation is necessary if, in passing between a production machine and a packing machine, the article has to be turned so that it can be fed to the packing machine the right way round.

DESCRIPTION OF THE PRIOR ART

A known arrangement is to divide the belt conveyor approximately at the centre and to drive the two belts of this divided conveyor at different speeds. When an article lies across the two conveyors and makes positive contact with both conveyor belts, there is a rotation of the article due to the difference in speed between the two halves of the conveyor.

However, a drawback of this known turning arrangement is that if the article is not exactly centred on the gap between the two halves of the belt conveyor, the rotation is asymmetric, i.e. it is not made through a given required angle according to the predetermined difference in speed. This means that the articles cannot be turned in a reproducible manner.

SUMMARY OF THE INVENTION

Accordingly it is an object of the present invention to develop a belt conveyor which is divided into at least two individual belt conveyors so that when the individual belt conveyors are driven at different speeds an extremely accurate and reproducible rotation of the parcel can be obtained.

This object is achieved in accordance with the invention in that a belt conveyor of the aforementioned type comprises part conveyor belts which pass around a tapered shaft comprising respective belt pulleys for the part conveyor belts, said belt pulleys being coupled to rotate together and having diameters which vary linearly over the length of the shaft. It is important that the conveyor section on which the article is to be rotated should comprise individual conveyor belts driven at different speeds; that the speeds of individual adjacent belts should be stepped in a precise ratio; and that all the conveyor belts should pass round a taper shaft driven in rotation and consisting of individual belt pulleys coupled together so as not to rotate relative to one another but only together.

The present invention has the major advantage that the individual conveyor belts, which may be formed e.g. as round-section belts or flat belts, can now be driven with a precisely stepped range of speeds by a single driven tapered shaft.

The fact that the tapered shaft is a driven shaft means that there is no need for other return shafts to be driven. According to the invention it is envisaged that all return shafts should comprise individual belt pulleys, with a pulley assigned to each conveyor belt, and that all belt pulleys should be mounted so as to be capable of rotating relative to one another on the respective idler shafts, that is to say they are not coupled to rotate together. In this way, a separate speed is assigned to each individual conveyor belt. In a typical embodiment, viewed across the width of the conveyor, the outermost conveyor belt on the left-hand side has the lowest speed, and the speed increases linearly over adjoining belts, until the outermost belt on the right-hand side is reached, with this belt running at the highest speed.

The difference in speeds between the individual conveyor belts is imparted by the taper of the driven shaft, that is to say by the difference in diameter between adjoining belt pulleys.

When an article to be rotated moves on to the start of the belt conveyor, it moves on to an arrangement of belts (depending on the width of the article), coming into contact, say, with the sixth to the sixteenth belts of this conveyor. As the difference in speed between belts 6–16 is exactly the same as for example that between belts 1 to 11, it does not matter where in relation to the width of the conveyor the parcel moves on to the conveyor. It is given a uniform rotation according to the set difference in speed (the chosen taper of the driven shaft), and according to the length of the conveyor.

The angle of turn is determined by the length of the section in which the underside of the article is frictionally acted upon by the speed difference of the individual conveyor belts.

In order that the rotation may be set to suit individual requirements, it is preferable for the length of the conveyor section to be made adjustable.

In a preferred embodiment, the conveyor section is made adjustable by making the position of the pulley shaft located at the end of the conveyor adjustable in the conveying direction. In this way the length of the conveyor section may be altered very simply, thus setting the angle of the turn, assuming that the taper of the driven shaft remains unchanged.

If the turning conveyor according to the invention is immediately followed by another make-up conveyor, the make-up conveyor should preferably be altered simultaneously when altering the length of the turning conveyor, so that there is no unwanted gap at the transfer between the turning conveyor and the ensuing make-up conveyor.

For this embodiment it is envisaged that the return roller of the make-up conveyor—i.e. the roller which leads, in the conveying direction—be mounted, together with the pulley shaft of the turning conveyor, located downstream in the conveying direction, on a common setting plate which is mounted in special guides in a machine frame so as to be capable of being shifted forward or back in the conveying direction. Thus, when for example, the length of the turning conveyor section is made shorter, the length of the following make-up conveyor is simultaneously extended.

A particular advantage of the present invention is due to the fact that only a single tapered shaft has to be used and all other return shafts are constructed as pulley shafts carrying individual idler pulleys which are separately mounted, with one conveyor belt running over each pulley.

Using parallel belt pulleys to form a return shaft yields the advantage that there can be a straight link to the associated feed and discharge conveyors, thus allowing an easy product-transfer between the upstream and downstream conveyors and the turning conveyor.

In a particularly preferred embodiment of the present invention, an additional setting device is provided for adjusting the turn.

It has been stated above that one possible way of adjusting the turn of articles on the conveyor is by altering the length of the conveyor section.

In a further embodiment which will now be described, there is a deflection device working in conjunction with a clutch device, and this deflection device makes it possible to neutralize the speed differential between the individual conveyor belts and to make all conveyor belts switch to synchronized running via a clutch. It is then possible, via a corresponding deflection device and clutch, to synchronize the differential speed drive of the individual conveyor belts so that all conveyor belts are driven at the same speed.

It is stated above that the tapered shaft comprises individual belt pulleys coupled for rotation together, without relative motion, on a common drive shaft. To provide the embodiment intended to synchronize the speeds of the individual conveyor belts, it is now proposed that the individual belt pulleys of stepped diameters be mounted on the shaft so as to be capable either of being coupled so as to revolve with the shaft or of running freely on the shaft. For this purpose a gripping screw is simply fitted, in the axial direction, to the end of the taper shaft. If this gripping screw is tightened, the stepped-diameter belt-pulleys are brought into frictional engagement with one another and pressed against a flange connected to the shaft and rotating with it, so that all belt pulleys are made to revolve with the shaft.

As soon as the gripping screw is loosened, the belt pulleys run freely, and are uncoupled from the tapered shaft.

In this case it is intended that the individual cord or flat conveyor belts should run not only over the previously described tapered shaft, but also run, with a sufficient angle of wrap, around a parallel drive shaft. Like the tapered shaft, this drive shaft comprises individual belt pulleys, but the pulleys are parallel, and have the same diameter over the axial length of the drive shaft. A similar clutch device with gripping screw is provided, so that it is again possible, at will, either to couple the equal-diameter parallel pulleys to the drive shaft or to uncouple them, releasing them to rotate freely on the drive shaft.

To switch from turning the article to straight-line conveying, the clutch coupling of the tapered shaft is simply uncoupled, so that the individual stepped-diameter belt-pulleys run freely, and, as a countermove, the gripping screw on the upper, parallel drive shaft is simultaneously tightened, so that all the equal-diameter belt-pulleys thereon are coupled to the drive shaft. In this way a switch is made from tapered drive to parallel drive. Although the individual conveyor belts are continuing to run over the stepped-diameter belt-pulleys of the taper shaft, there is no longer any difference in speed, as these individual belt pulleys are uncoupled from their drive.

The result is a simple facility for switching over from "parallel drive" to "taper drive".

It means that along the path followed by the individual conveyor belts there is a parallel drive shaft whose parallel belt pulleys may either be coupled to the drive or uncoupled from it, while contrariwise the stepped-diameter belt-pulleys of the tapered shaft are uncoupled or coupled with the drive shaft. Hence there is no need to change the whole conveyor unit if turning is no longer desired, and the article is required to pass over the conveyor section without turning.

It is, of course, also possible to make the clutch with the two gripping screws electromagnetically-controlled, so that a switch can be made from turning to straight-line motion in mid-conveyor, i.e. while the article is moving along the conveyor.

This switchover can, if need be, also be made by computer using an optical recognition device, the rotation of the article being monitored by a video camera, and the changeover from turning drive to straight-line drive being made by suitable switching means immediately a predetermined angle of turn has been made.

It is also possible, instead of monitoring the turn optically, which is relatively expensive, to use a simple time control, that is to say the presence of the turned article on the conveyor is timed and it is assumed that the article has then turned through a certain predetermined angle. After this time has elapsed a switch is made from taper drive to parallel drive.

Thus an important feature of the present invention is that switches can be made to any desired angles of turn between 0° and 90°, even while the machine is running. A further desirable feature is that continuous turning is possible. Several articles may, provided they do not come into contact with one another, be present on the conveyor section at the same time, and all are uniformly and continuously turned in succession. Another advantageous feature is that the entire conveyor unit need only have a single drive motor to drive both the parallel drive and the taper drive, and this can additionally be used for driving a downstream make-up conveyor.

BRIEF DESCRIPTION OF THE DRAWINGS

Further objects and advantages of the invention will emerge from the following detailed description when read with reference to the accompanying drawings which illustrate a preferred embodiment thereof. In the drawings.

DETAILED DESCRIPTION OF THE PREFERRED EMBODIMENT

Figure 1:
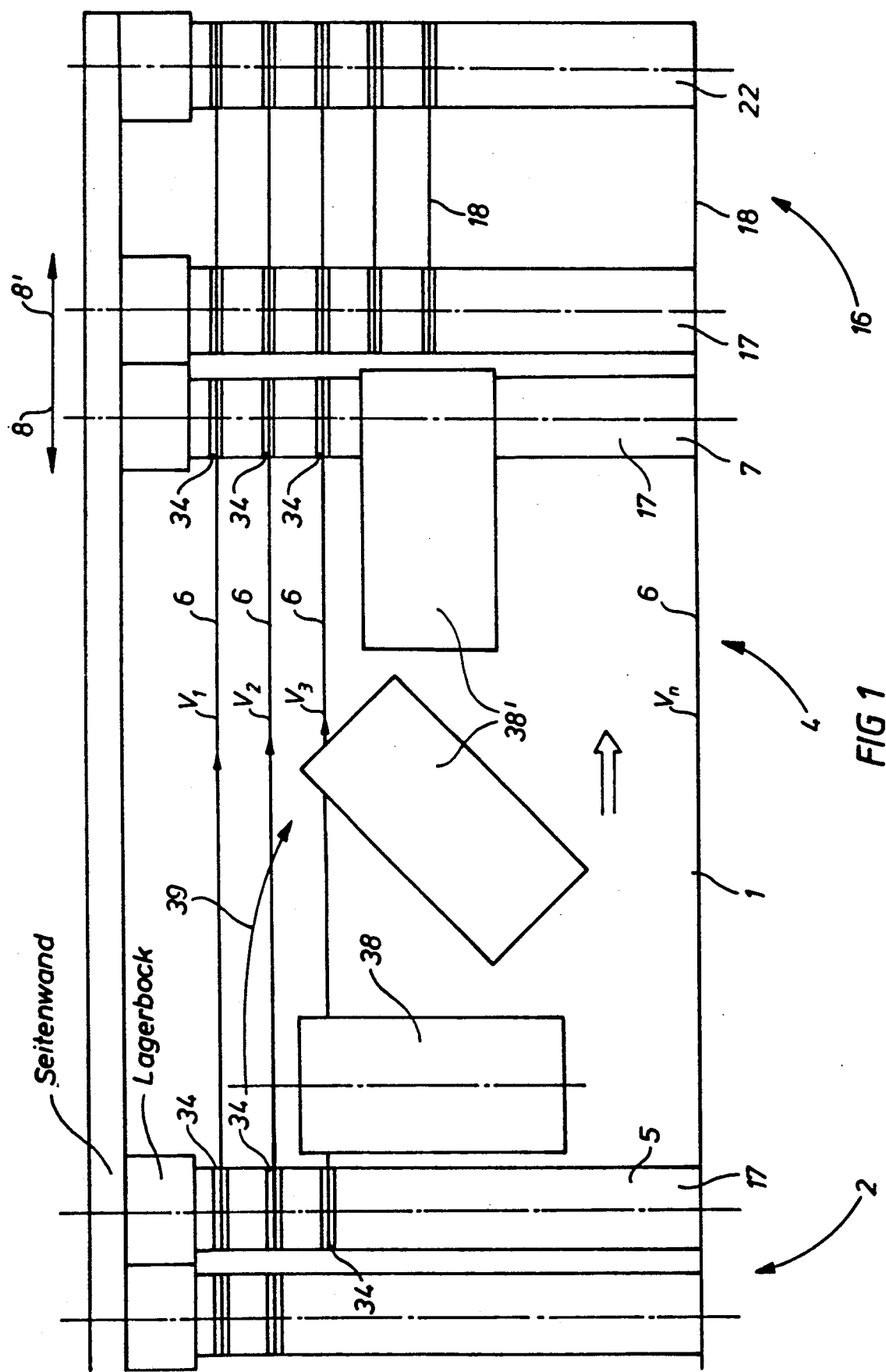
FIG. 1 is a diagrammatic plan view, in the direction of Arrow I in FIG. 2, of a turning conveyor according to the invention with an upstream feed conveyor and a downstream make-up conveyor.

The conveyor device shown in FIG. 1 comprises a feed conveyor 2, a conveyor 4 on which packages 38 are to be continuously turned in the direction of Arrow 39, and a downstream make-up conveyor 16.

In place of the feed conveyor 2 other feed systems may also be used, such as for example fork lifts which place the package 38 on the belt conveyor 4.

The make-up conveyor 16 is merely for transferring the turned package 38 coming from the conveyor 4 to another unit. In place of the make-up conveyor 16, another transfer device may also be provided.

Here it is advantageous for the pulley shaft 5 at the input end of the conveyor 4 to be of parallel design, yielding a straight and practically gap-free transition to the feed conveyor 2. The same advantage is gained by a pulley shaft 7 at the discharge end with respect to the make-up conveyor 16 and its return roller 17.

According to the invention the conveying section of the conveyor 4 comprises individual conveyor belts 6 arranged side by side, each conveyor belt being assigned a different speed from its neighbour. The speeds are schematically indicated here by V1, V2, V3 ... Vn.

As the package 38 which is to be turned passes over the pulley shaft 5 at the input end of the conveyor 4 on to the conveying section, it comes into frictional contact with a number of conveyor belts 6 arranged side by side. It will be assumed that the package 38 to be turned is resting on a conveyor belt at its centre, and that the conveyor belts to the left of centre are running more slowly and the conveyor belts to the right of centre are running more rapidly. This automatically causes the package to rotate, as different speeds are acting on the outer edges of the package.

Thus, the rotation of the package is governed by its width, i.e. by the number of conveyor belts frictionally contacting the underside of the package and the resulting differences in speed, For a very wide product, the initial rotation of the package is fast, because it rests with its edges on a very slowly running conveyor belt at one side and on a very rapidly running conveyor belt at the other side; however, this rotation slows down as the package rotates towards the conveyor path, as the edges of the package then pass on to belts which do not exhibit such large differences in speed.

An important feature to note is that it makes no difference at which point the package moves on to the conveyor. It may be fed in at the extreme left or extreme right or at the centre of the belt conveyor; a uniform turn is always obtained, and this turn is governed by the above-mentioned parameters.

In the embodiment shown in FIG. 1, the package 38 is being rotated into its position 38', for which an angle of turn of 45° is shown as an example. It goes without saying that any desired angles of turn between 0° and 90° can be obtained; if the conveying section of the conveyor 4 is sufficiently long, it is even possible to rotate the package 38 through 360°.

It has been found that particularly rapid rotation over a short conveyor section is obtained when the package 38 to be rotated is fed to the conveyor 4 long side first (as shown in FIG. 1). To enable the angle of turn in the direction of Arrow 39 to be set, the length of the conveyor 4 can be varied in the direction of Arrows 8, 8', as will now be explained in connection with FIG. 2.

Figure 2:
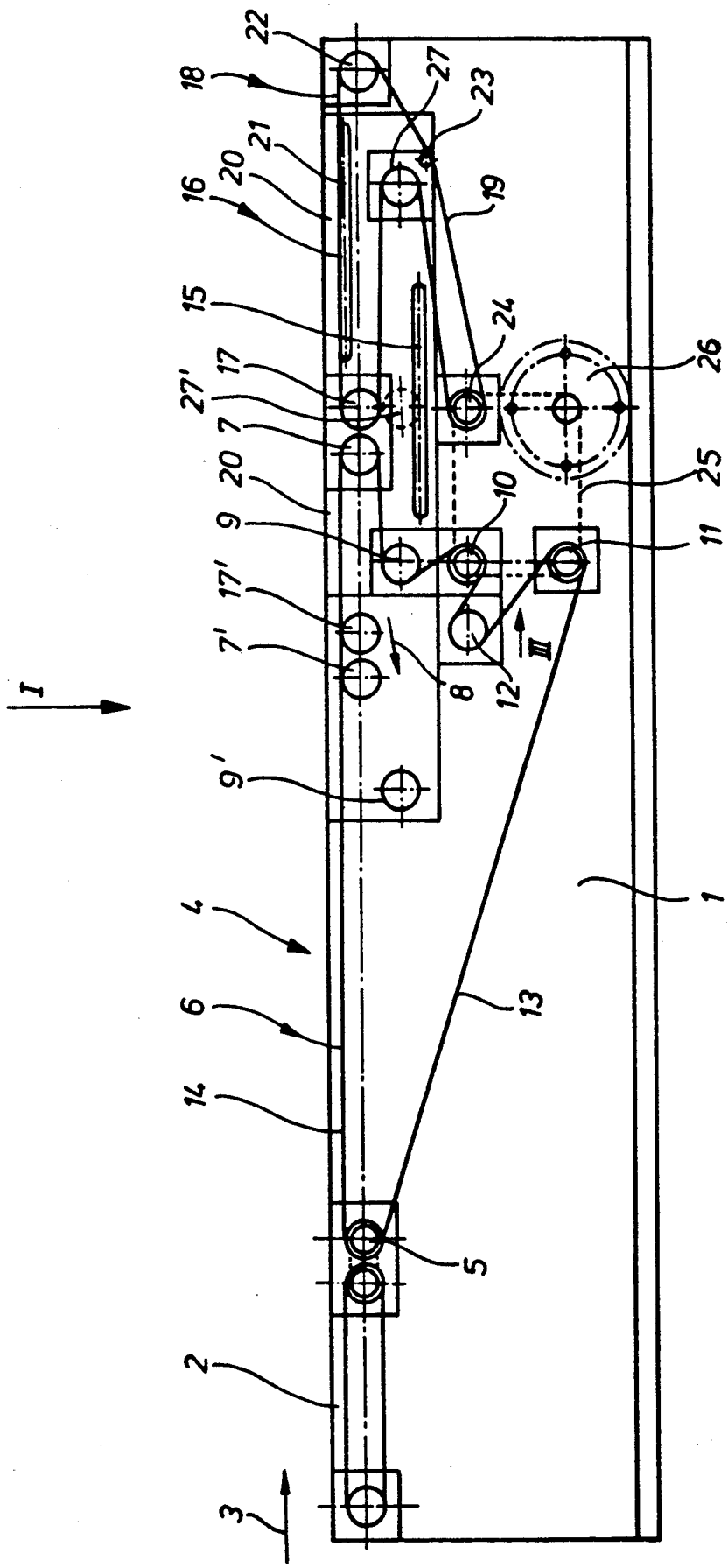
FIG. 2 is a diagrammatic side elevation of the conveyor according to FIG. 1.

FIG. 2 shows in elevation the same situation as in FIG. 1. The leading pulley shaft 5 is rotatably mounted in a machine frame 1, all the pulley shafts 5, 7, 9, 12 hereinafter mentioned being parallel shafts, in each case with belt pulleys 34 mounted on them so as to be individually capable of rotating on a common shaft. The package 38 which is to be rotated comes in the direction of Arrow 3 over the feed conveyor 2 and on to the conveyor 4.

As described in connection with FIG. 1, a number of conveyor belts 6 arranged at close intervals alongside one another run around the pulley shaft 5 located at the input end. The spacing of the individual conveyor belts 6 from one another depends on the nature of the article to be turned. For example, if cheese slices with sides measuring 10×10 cm are to be turned, 10 to 15 conveyor belts will preferably be adopted, positioned at intervals of 5 mm.

Starting from the pulley shaft 5 each conveyor belt 6 runs with its upper strand 14 going round a parallel pulley shaft 7 located at the discharge end. Going on from there, each conveyor belt 6 runs round another pulley shaft 9 which acts as a deflection shaft, over a parallel drive shaft 10, which will be described later in connection with FIG. 3. From the drive shaft 10, a further pulley shaft 12 is wrapped, after which each conveyor belt runs round a tapered shaft 11.

The only purpose of the parallel pulley shaft 12 located between the parallel drive shaft 10 and the tapered shaft 11 is to obtain a sufficient angle of wrap both on the drive shaft 10 and on the tapered shaft 11 for each conveyor belt 6. An important feature is that only the belt pulleys 34 of the parallel drive shaft 10, or alternatively only the belt pulleys 30 of the tapered drive shaft 11, are driven; and that the belt pulleys 30, 34 are never driven together.

After passing around the tapered shaft 11 the conveyor belt 6 passes back by its lower strand 13 to the pulley shaft 5 located at the input end of the conveyor.

The make-up conveyor 16 which immediately follows the discharge end of the conveyor 4 likewise essentially consists of a number of parallel, synchronously driven conveyor belts 18, each conveyor belt passing around a parallel return roller 17 at the input end and over a return roller 22, likewise parallel, at the discharge end. The lower strand 19 is then guided over a smaller deflection roller 23 to a drive shaft 24 whence it goes over a deflection roller 27 and back to the return roller 17 located at the input end of the conveyor.

To alter the conveying length of the conveyor 4 in the direction of the arrows 8, 8', provision is made for making a corresponding simultaneous adjustment of the conveying length of the make-up conveyor. For this purpose the shafts 7, 9, 17, 27 are arranged on a common setting plate 20 which is guided in setting guides 15, 21 so as to be capable of being shifted in the machine frame 1 in the direction of the arrows 8, 8', the shafts thus being collectively and synchronously positioned by shifting the setting plate 20, in the positions shown by broken lines in FIG. 2. In this way, when they are shifted in the direction of the arrow 8 for example, the conveying length of the conveyor 4 is shortened and the conveying length of the make-up conveyor 16 is simultaneously extended.

An important feature of this embodiment of the invention is that the whole of the drive of the conveyor 4 and the make-up conveyor 16 is provided by a single motor 26, which drives a toothed belt 25 which passes around the tapered shaft 11, drive shaft 10, drive shaft 24, and the drive shaft of the motor itself.

Figure 3:
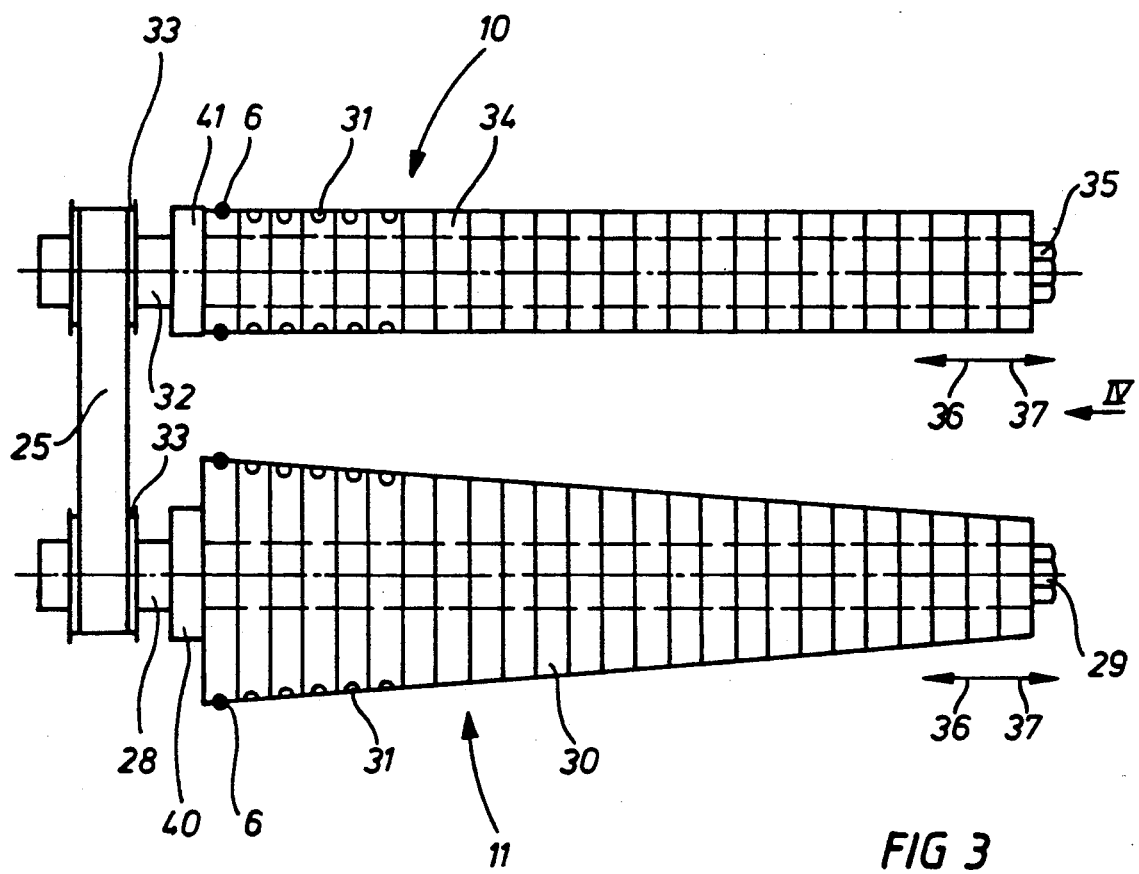
FIG. 3 is an elevation of the parallel and taper drives viewed in the direction of Arrow III in FIG. 2.
Figure 4:
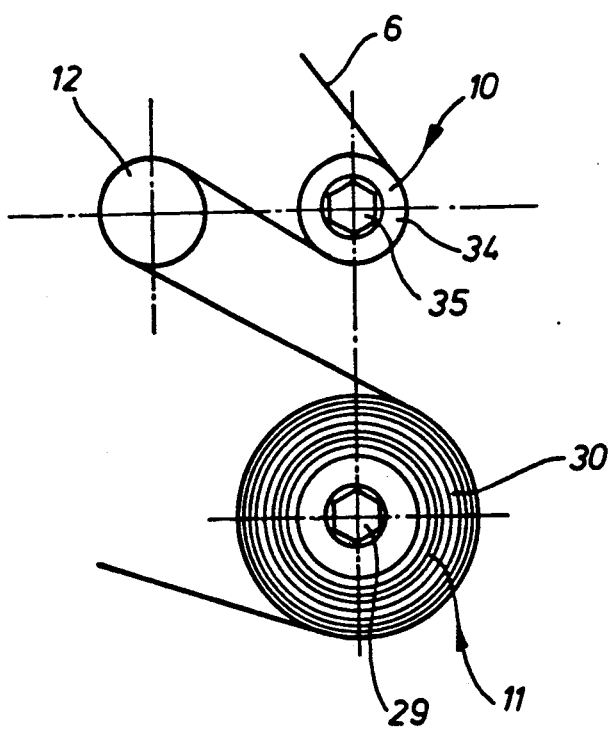
FIG. 4 is an end view of the arrangement according to FIG. 3.

Further details of this transmission can be seen in FIGS. 3 and 4.

Shafts 28, 32 are always synchronously driven by the toothed belt 25, via drive wheels 33.

Belt pulleys 34 of equal diameter are arranged on the upper drive shaft 10, each belt pulley 34 possessing an annular groove 31 to receive the round-section conveyor-belt 6.

In the coupled condition the belt pulleys 34 are pressed by a gripping screw 35, fitted at the end of the shaft, against a flange 41 which is connected to the shaft 32 so as to rotate with it, so that the belt pulleys 34 are coupled to the shaft 32 and rotate with it in a synchronous manner.

A similar coupling arrangement is provided on the lower tapered drive shaft 11. Here the belt pulleys 30 have different diameters, stepped over the axial length of the taper shaft 11, all belt pulleys 30 again being capable of being pressed by a gripping screw 29 against a flange 40 connected to the shaft so as to rotate with it, and are thus capable of being coupled to the shaft 28 so as to rotate with it.

At any one time, either the belt pulleys 34 are coupled to the shaft 32 or the belt pulleys 30 are coupled to the shaft 28. When the gripping screw 35 is tightened in the direction of Arrow 36, the gripping screw 29 is loosened in the direction of Arrow 37. Contrariwise, when the gripping screw 29 is tightened in the direction of Arrow 36, the gripping screw 35 is loosened in the direction of Arrow 37.

In place of the gripping screws shown here, it goes without saying that an electromagnetic, hydraulic or pneumatic clutch coupling can be used.

Likewise usable are any suitable clutch mechanisms which enable a plurality of belt pulleys to be coupled to, or uncoupled from, a rotating shaft.

In FIG. 4, the stepped diameters of the individual belt pulleys 30 can be seen in the end view of the taper shaft 11.

We claim:

1. A turning device for articles being carried by a conveyor comprising:
   a plurality of endless part conveyor belts extending parallel to one another in a conveying plane, each said part conveyor belt being arranged to run around a set of idler pulleys which are rotatable independently of the idler pulleys of the other part conveyor belts;
   a drive shaft drivable in rotation, on which are mounted a plurality of belt pulleys, one engaging each of said part conveyor belts, the effective diameters of said pulleys increasing over the length of said shaft;
   means for driving said shaft in rotation;
   means for coupling together the pulleys on said shaft to rotate together whereby when the shaft is driven said part conveyor belts are driven at different speeds and a velocity gradient is set up across the width of said conveying plane to turn articles being carried thereon;
   a make-up conveyor located at the downstream end of said conveying plane for receiving articles from said conveyor belts, said make-up conveyor including a rotatably mounted return roller at the article receiving end of said make-up conveyor;
   one set of idler pulleys being mounted on a shaft provided at the end of the conveying plane, the position of said idler pulley shaft and return roller being adjustable in the conveying direction to vary the length of said conveying plane; and
   said driving means comprising a single drive for said drive shaft and said make-up conveyor.

2. A turning device as claimed in claim 1, wherein the return roller of said make-up conveyor is rotatably mounted, together with the idler pulley shaft of the turning located at the downstream end in the conveying direction, on a common setting place which is mounted in setting guides in a machine frame so as to be capable of shifting in the conveying direction, and in the direction opposite to the conveying direction.

3. A turning device for articles being carried by a conveyor, comprising
   a plurality of endless conveyor belts extending parallel to one another in a conveying plane, each said conveyor belt being arranged to run around a set of idler pulleys of equal diameter at each end of the conveying plane;
   a shaft drivable in rotation, on which are mounted a plurality of belt pulleys, one engaging each of said conveyor belts, the effective diameters of said pulleys increasing over the length of said shaft;
   means for driving said shaft in rotation;
   means for coupling together the pulleys on said shaft to rotate together whereby when the shaft is driven said conveyor belts are driven at different speeds and a velocity gradient is set up across the width of said conveying plane to turn articles being carried thereon; and
   a changeover device with a coupling device, the changeover device comprising means for switching off the speed differential between the conveyor belts so that all the conveyor belts can be synchronously driven in rotation.

4. A turning device as claimed in claim 3 wherein said changeover device comprises a set of belt pulleys having the same diameter, one for each said part conveyor belt, mounted on a shaft provided with drive means and engageable therewith to be driven together in rotation, with the belt pulleys of different diameters disengaged from one another to be independently rotable, to impart a uniform conveying speed to the belts.

5. A turning device as claimed in claim 4, further comprising a gripping screw provided at one end of each of said driven shafts to couple and uncouple the pulleys thereon.

6. A turning device as claimed in claim 1 wherein the part conveyor belts are guided through an angle of wrap around an additional drive shaft.

7. A turning device as claimed in claim 6, wherein the additional drive shaft comprises belt pulleys which have the same diameter.

8. A turning device as claimed in claim 7, further comprising a clutch coupling device with a gripping screw provided on the additional drive shaft so that the belt pulleys thereon can optionally be coupled together or allowed to run freely.

9. A conveying device comprising a machine frame in which is mounted a turning conveyor having upstream and downstream ends and arranged to receive an article from an input conveyor at its upstream end and to convey said article to a make-up conveyor at its downstream end, said turning conveyor comprising:
   a plurality of endless part conveyor belts which extend between upstream and downstream idler rollers around which they pass and between which they extend parallel to one another to form a conveying plane;
   a first drivable shaft having a plurality of belt pulleys thereon around each of which passes one of said part conveyor belts, the diameters of said belt pulleys increasing linearly from one end of said shaft to the other;
   a second drivable shaft having a plurality of belt pulleys thereon of equal diameter around each of which passes one of said part conveyor belts;
   means provided on each of said first and second drivable shafts for coupling the pulleys thereon to rotate together at the same rotation speed as the shaft is driven, the pulleys when not so coupled being freely rotatable relative to one another, and
   means for selectively driving in rotation either of said first and second drivable shafts, with the pulleys thereon coupled, the pulleys on the shaft not being driven being disengaged, whereby when said first drivable shaft is driven with its pulleys coupled together the part conveyor belts move at differing speeds in said conveying plane to rotate an article being carried thereon, and when said second drivable shaft is driven with its pulleys coupled together the part conveyor belts all move at the same speed to convey an article without turning it.

10. A conveying device as claimed in claim 9 wherein the length of said conveying plane is adjustable by displacement of one of said upstream and downstream idler rollers, in the conveying direction or in the opposite direction.

11. A conveying device as claimed in claim 10 wherein said idler roller is displaced together with an idler roller of the adjacent conveyor, the two said rollers being mounted in a common setting plate.

* * * * *